US008520867B2

(12) United States Patent
Koike et al.

(10) Patent No.: US 8,520,867 B2
(45) Date of Patent: Aug. 27, 2013

(54) EMBEDDED AUDIPHONE

(75) Inventors: Takuji Koike, Tokyo (JP); Naohito Hato, Ehime (JP); Kensei Yamamoto, Tokyo (JP)

(73) Assignees: The University of Electro-Communications, Tokyo (JP); Ehime University, Ehime (JP)

( * ) Notice: Subject to any disclaimer, the term of this patent is extended or adjusted under 35 U.S.C. 154(b) by 202 days.

(21) Appl. No.: 13/120,813

(22) PCT Filed: Sep. 16, 2009

(86) PCT No.: PCT/JP2009/066709
§ 371 (c)(1),
(2), (4) Date: Jun. 7, 2011

(87) PCT Pub. No.: WO2010/035812
PCT Pub. Date: Apr. 1, 2010

(65) Prior Publication Data
US 2011/0243356 A1      Oct. 6, 2011

(30) Foreign Application Priority Data

Sep. 25, 2008  (JP) .................................. 2008-246342

(51) Int. Cl.
    *H04R 25/00*  (2006.01)
(52) U.S. Cl.
    USPC ............................ 381/151; 381/326; 381/380
(58) Field of Classification Search
    USPC ........... 381/151, 312, 326, 328, 380; 310/26; 600/25; 607/57
    See application file for complete search history.

(56) References Cited

U.S. PATENT DOCUMENTS

| 5,624,376 | A | 4/1997 | Ball et al. |
| 5,913,815 | A | 6/1999 | Ball et al. |
| 2001/0047193 | A1 | 11/2001 | Zierhofer et al. |
| 2004/0234092 | A1* | 11/2004 | Wada et al. ............... 381/331 |
| 2007/0191673 | A1 | 8/2007 | Ball et al. |

FOREIGN PATENT DOCUMENTS

| DE | 60125716 | 11/2007 |
| JP | 62 277955 | 12/1987 |
| JP | 62-277955 | 12/1987 |
| JP | 9 261797 | 10/1997 |
| JP | 11 506572 | 6/1999 |
| JP | 2003 521337 | 7/2003 |
| JP | 2004 343446 | 12/2004 |
| JP | 2009 526612 | 7/2009 |
| WO | WO 96 21335 | 7/1996 |
| WO | WO 01 56521 | 8/2001 |
| WO | WO 2007 095196 | 8/2007 |

* cited by examiner

*Primary Examiner* — Duc Nguyen
*Assistant Examiner* — Matthew Eason
(74) *Attorney, Agent, or Firm* — Frommer Lawrence & Haug LLP; William S. Frommer

(57) ABSTRACT

Provided is a high-accuracy embedded audiphone.
A transducer (34) made of a giant magnetostrictive element is provided in an intracorporeal unit (3) that is embedded in a skull (5). An audible sound modulation transmission signal (S1), which is amplitude-modulated by a sound collection signal generated in an extracorporeal unit (2), is transmitted from an extracorporeal transmitter coil (31) to an intracorporeal receiver coil (32) provided in the intracorporeal unit (3) with the help of a transmission magnetic flux (33). Moreover, because of an induced electromotive force of the intracorporeal receiver coil (32), the transducer (34) expands and contracts. Therefore, it is possible to highly accurately conduct an audible sound signal through bone with no power source or demodulation circuit provided in the intracorporeal unit (3).

1 Claim, 10 Drawing Sheets

EMBEDDED AUDIPHONE

TECHNICAL FIELD

The present invention relates to an embedded audiphone and particularly to an embedded audiphone designed to conduct audible sound vibrations through bone with great sensitivity.

BACKGROUND ART

What is proposed in the prior-art Patent Documents 1 to 4 are audiphones that conduct audible sound vibrations, not through the narrow and complicated ear canal but through the skull, to the inner ear including the vestibule and cochlea in the skull.

Patent Document 1: Japanese Patent Application No. H9-261797
Patent Document 2: Japanese Patent No. 3174324
Patent Document 3: Japanese Laid-open Patent Publication No. 2004-289219
Patent Document 4: Japanese Laid-open Patent Publication No. 2007-184722

In contrast to the above, among audiphones of such a kind that have been put to practical use, first what is proposed is the one whose audible-sound transducer is strongly pushed by a head strap or the like against the skull through the scalp in order to conduct sound vibrations to the skull from outside the scalp. However, the problem is that a user wearing the audiphone bears a considerable burden.

Secondly, there is an audiphone having a structure in which a titanium bone-conduction terminal is embedded in a postauricular region with an external transducer attached to the titanium bone-conduction terminal. However, the audiphone is inconvenient for use because the titanium bone-conduction terminal is exposed on the skin in the postauricular region. Moreover, the output power of the external transducer is not sufficient; a large value of bone-conduction hearing ability, at least about 45 dB, is required. Therefore, the problem is that the audiphone has limited uses.

DISCLOSURE OF THE INVENTION

The present invention has been made in view of the above points and is aimed at providing an embedded audiphone that enables wide-band audible sound vibrations to be bone-conducted with sufficient output power with the help of an embedded intracorporeal unit.

To solve the above problems, what is provided according to the present invention is: an extracorporeal unit 2 that generates a transmission magnetic flux 33 using an extracorporeal transmitter coil 31 on the basis of an audible sound modulation transmission signal S1 that is obtained by amplitude-modulating a carrier wave signal S3 with the use of a sound collection signal S2 obtained from a microphone 11; and an intracorporeal unit 3 that is embedded in a skull 5 under scalp 4, generates an induced electromotive force S11 with the use of the transmission magnetic flux 33 coming from the extracorporeal unit 2 and an interlinked intracorporeal receiver coil 32, expands and contracts a transducer 34 made of a giant magnetostrictive element with the use of the induced electromotive force S11, and therefore supplies vibrations corresponding to the sound collection signal S2 to the skull 5 as bone-conduction vibrations.

According to the present invention, a transducer made of a giant magnetostrictive element is provided in an intracorporeal unit that is embedded in a skull. An audible sound modulation transmission signal, which is amplitude-modulated by a sound collection signal generated in an extracorporeal unit, is transmitted from an extracorporeal transmitter coil to an intracorporeal receiver coil provided in the intracorporeal unit with the help of a transmission magnetic flux. Moreover, because of an induced electromotive force of the intracorporeal receiver coil, the transducer expands and contracts. Therefore, it is possible to highly accurately conduct an audible sound signal through bone with no power source or demodulation circuit provided in the intracorporeal unit.

BEST MODE FOR CARRYING OUT THE INVENTION

The following describes in detail an embodiment of the present invention with reference to the accompanying drawings.

(1) Configuration of Embedded Audiphone

Figure 1:
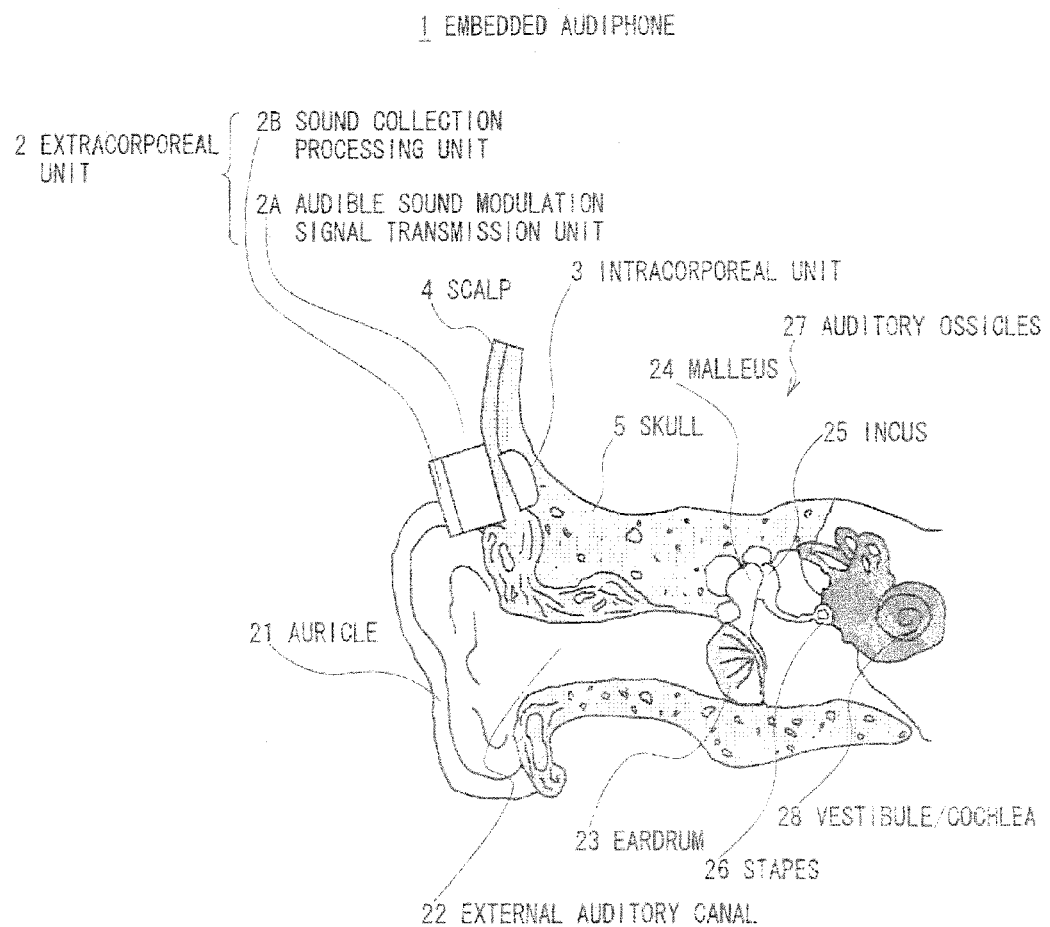
FIG. 1 is a partial cross-sectional view showing an embedded audiphone according to an embodiment of the present invention.

In FIG. 1, the reference numeral 1 denotes an embedded audiphone that includes an extracorporeal unit 2 and an intracorporeal unit 3.

The extracorporeal unit 2 is embedded in a skull 5 that is covered with scalp 4. The extracorporeal unit 2 includes an audible sound modulation signal transmission unit 2A, which is placed on the scalp 4 so as to face the intracorporeal unit 3; and a sound collection processing unit 2B, which supplies an audible sound modulation transmission signal S1 to the audible sound modulation signal transmission unit 2A.

Figure 2:
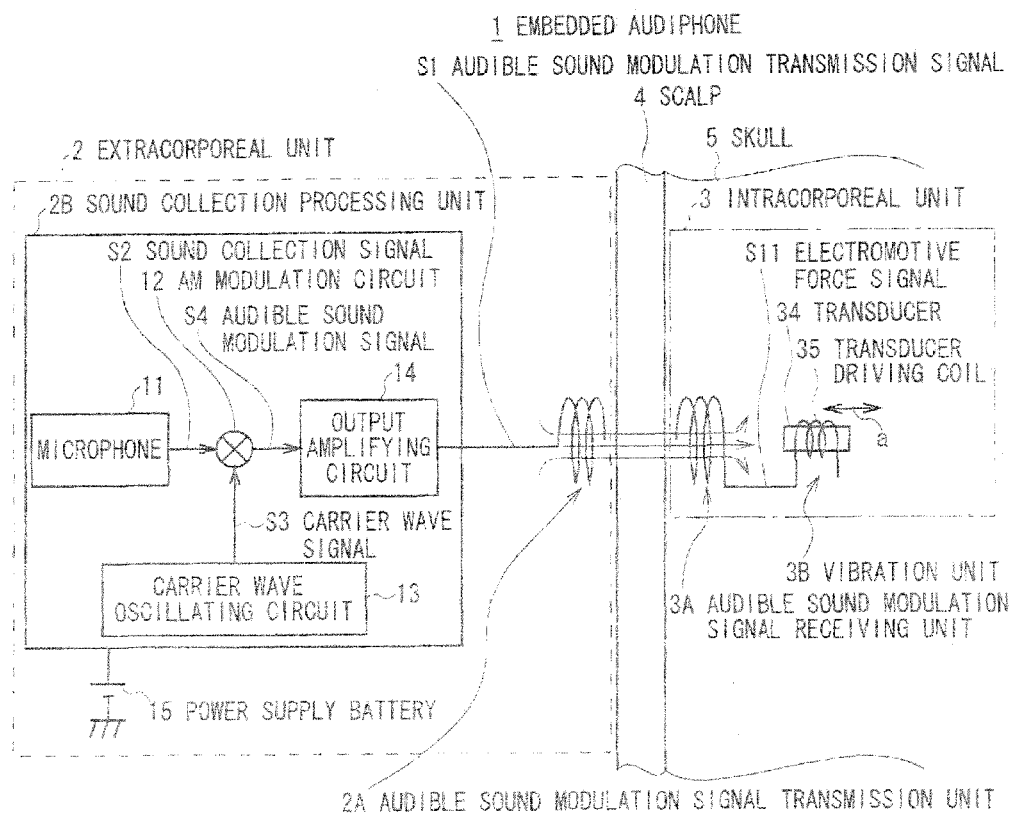
FIG. 2 is a schematic electrical circuit diagram showing a generation structure for audible sound vibrations of the embedded audiphone 1 shown in FIG. 1.

As shown in FIG. 2, the sound collection processing unit 2B inputs a sound collection signal S2 obtained by a microphone 11 into an AM modulation circuit 12 where a carrier wave signal S3 supplied from a carrier wave oscillating circuit 13 is amplitude-modulated (AM-modulated) with the use of the sound collection signal S2. In this manner, an audible sound modulation signal S4 is generated.

The audible sound modulation signal S4 is amplified by an output amplifying circuit 14 and then fed to the audible sound modulation signal transmission unit 2A as the audible sound modulation transmission signal S1.

The sound collection processing unit 2B is driven by a power supply battery 15 and operates.

The intracorporeal unit 3 (FIG. 1) is embedded in a portion (the temporal bone under the skin of the mastoid portion, for example) adjacent to the auricle 21 of a user wearing the audiphone. Therefore, the microphone 11 of the sound collection processing unit 2B, which makes up the extracorporeal unit 2 that is so positioned as to face the intracorporeal unit 3, is able to collect audible sound, which the user wearing the embedded audiphone 1 can hear under normal circumstances as the sound reaches an eardrum 23 through an external auditory canal 22.

Accordingly, when the user wearing the audiphone can hear audible sound properly, the vibrations of the eardrum 23 are passed on to vestibule/cochlea 28 through auditory ossicles 27 including a malleus 24, an incus 25 and a stapes 26. Therefore, sound information is transmitted from the cochlea to a brain stem.

Instead of conveying sound through the external auditory canal 22, the embedded audiphone 1 supplies the audible sound modulation transmission signal S1 to an audible sound modulation signal receiving unit 3A of the intracorporeal unit 3 embedded in the skull 5 from the extracorporeal unit 2, thereby creating audible sound vibrations in the intracorporeal unit 3 and conveying the audible sound vibrations to the auditory ossicles 27 through the skull 5.

Figure 3:
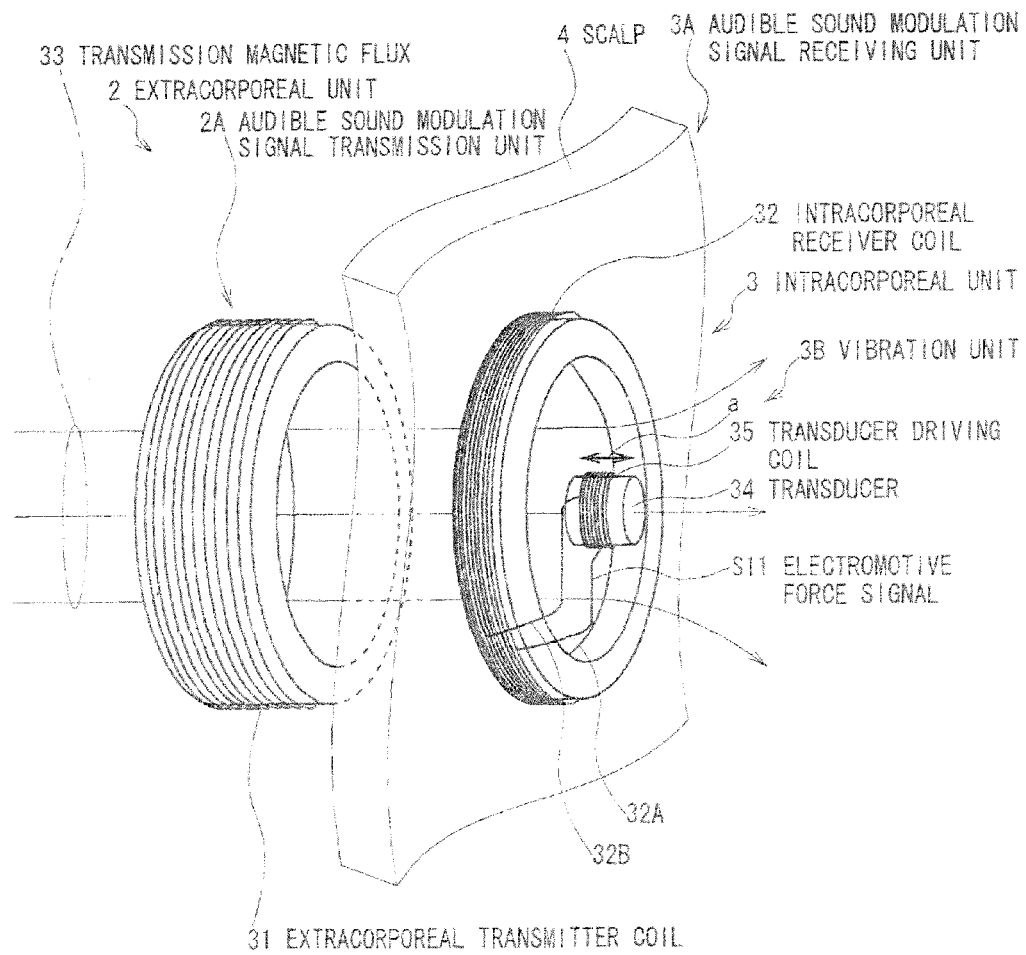
FIG. 3 is a schematic perspective view for explaining a method of conveying an audible sound transmission signal to an inner part of a body.

The audible sound modulation signal transmission unit 2A of the extracorporeal unit 2 includes an extracorporeal transmitter coil 31 as shown in FIG. 3, which serves as a means for transmitting the audible sound modulation transmission signal S1 through the scalp 4 to the audible sound modulation signal receiving unit 3A of the intracorporeal unit 3.

In the intracorporeal unit 3, an intracorporeal receiver coil 32, which makes up the audible sound modulation signal receiving unit 3A, is so provided as to face the extracorporeal transmitter coil 31 across the scalp 4. Therefore, a transmission magnetic flux 33, which emerges as the audible sound modulation transmission signal S1 flows through the extracorporeal transmitter coil 31, is interlinked with the intracorporeal receiver coil 32 through the scalp 4. Thus, an electromotive force signal S11 is generated across both end terminals 32A and 32B of the intracorporeal receiver coil 32.

The electromotive force signal S11, which emerges on the intracorporeal receiver coil 32, is in the same modulation signal format as the audible sound modulation signal S4 (FIG. 2) that the AM modulation circuit 12 obtains. Therefore, a signal containing audible sound information is conveyed from the extracorporeal unit 2 to the intracorporeal unit 3; the electromotive force signal S11 that is obtained across the both end terminals 32A and 32B of intracorporeal receiver coil 32 is fed to a vibration unit 3B, which makes up the intracorporeal unit 3.

The vibration unit 3B includes a rod-shaped transducer 34 and a transducer driving coil 35, which is wound around the transducer 34. The supply of the electromotive force signal S11 to the transducer driving coil 35 generates a magnetic flux, which passes through in a length direction of the rod-shaped transducer 34.

The transducer 34 is made of a giant magnetostrictive material: the length of the transducer varies according to the amount of the magnetic flux as the magnetic flux passes through in the length direction. Therefore, the length of the rod-shaped transducer 34 varies according to the electromotive force signal S11.

In this case, as described above, the electromotive force signal S11 changes in the same signal format as the audible sound modulation signal S4 obtained from the AM modulation circuit 12. Therefore, in response to the sound collection signal S2, which is a result of sound collection by the microphone 11, the length of the transducer 34 vibrates in a direction indicated by arrow a. The vibrations are then fed to the skull 5 as an output of the embedded audiphone 1.

In that manner, in the embedded audiphone 1, as for the audible sound collected in the extracorporeal unit 2, the intracorporeal unit 3 supplies the vibrations associated with the collected audible sound to the skull 5. The vibrations are conveyed to the auditory ossicles 27 via the skull 5 and transmitted as sound information from the vestibule/cochlea 28 to the brain stem.

(2) Example

Figure 4:
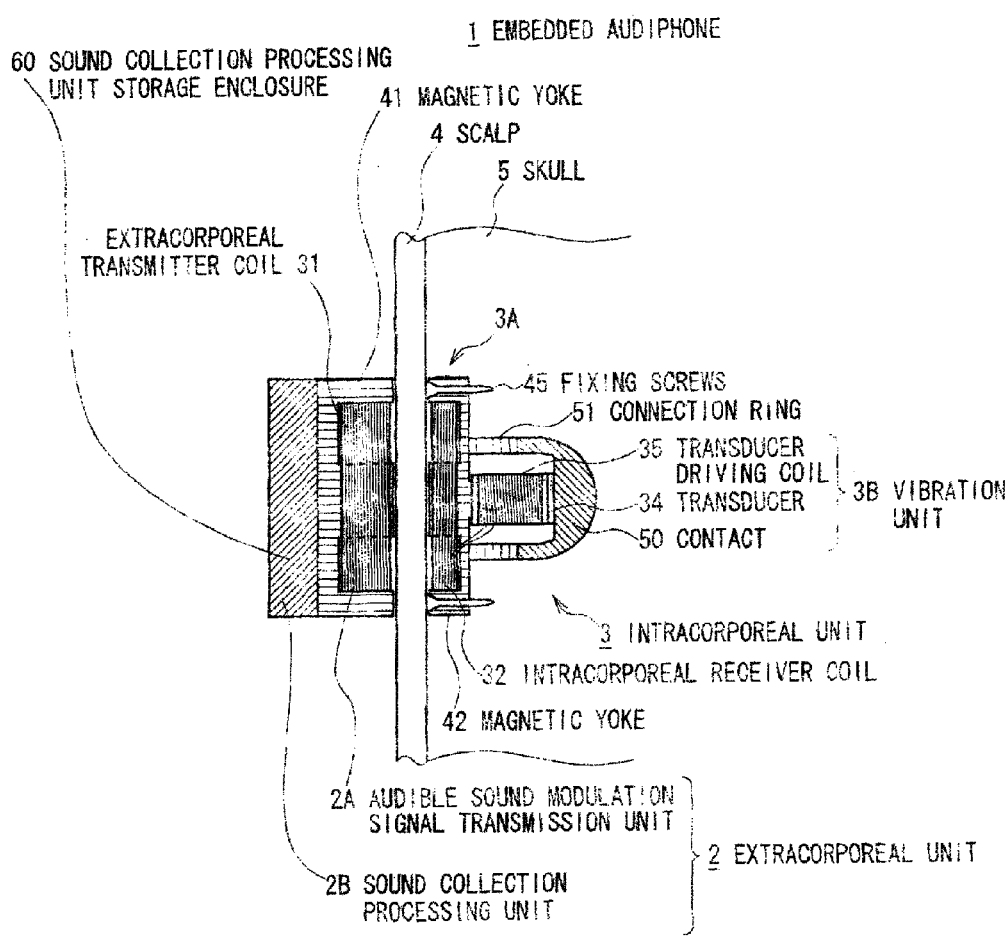
FIG. 4 is a longitudinal cross-sectional view showing the configuration of an embedded audiphone according to an example of the present invention.
Figures 5A, 5B:
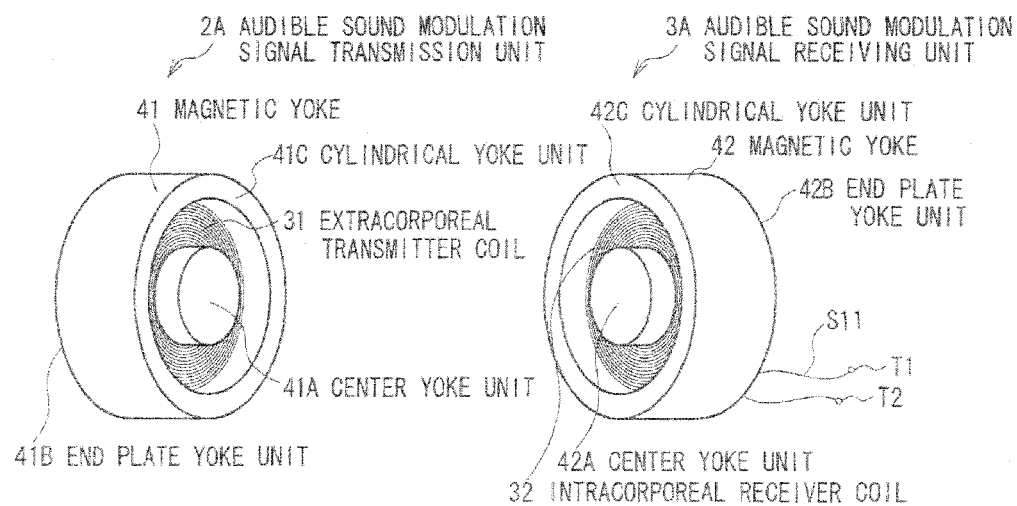
FIGS. 5A and 5B are perspective views showing transmitting and receiving structures that make up signal conveying mechanisms for conveying audible sound modulation transmission signals to an inner part of a body.

FIG. 4 shows an example of the above embodiment; the corresponding portions are represented by the same reference symbols. As shown in FIG. 5A, the audible sound modulation signal transmission unit 2A of the extracorporeal unit 2 includes a magnetic yoke 41, whose longitudinal cross-sectional surface is in the shape of "E" and which externally looks like a circular cylinder as a whole. The extracorporeal transmitter coil 31 is wound around a cylindrical center yoke unit 41A of the magnetic yoke 41.

Therefore, thanks to the extracorporeal transmitter coil 31, for the transmission magnetic flux 33 generated on the center yoke unit 41A, a magnetic path is formed from the center yoke unit 41A through a disc-shaped endplate yoke unit 41B so as to pass through a cylindrical yoke unit 41C, which is in the shape of a cylinder.

Accordingly, when the extracorporeal transmitter coil 31 is put on the scalp 4, the top surfaces of the center yoke unit 41A and cylindrical yoke unit 41C of the magnetic yoke 41 are disposed on the scalp 4.

The intracorporeal unit 3 includes a magnetic yoke 42, whose longitudinal cross-sectional surface is in the shape of "E" and which externally looks like a circular cylinder: the magnetic yoke 42 faces the magnetic yoke 41. The intracorporeal receiver coil 32 is wound around a cylindrical center yoke unit 42A of the magnetic yoke 42.

In the center yoke unit 42A of the magnetic yoke 42, in response to the transmission magnetic flux 33 generated on the cylindrical center yoke unit 41A of the magnetic yoke 41 of the extracorporeal unit 2, a magnetic path is formed: The magnetic path allows the transmission magnetic flux 33 to flow to the magnetic yoke 41 of the extracorporeal unit 2 through a disc-shaped end plate yoke unit 42B and a cylindrical yoke unit 42C.

Figure 6:
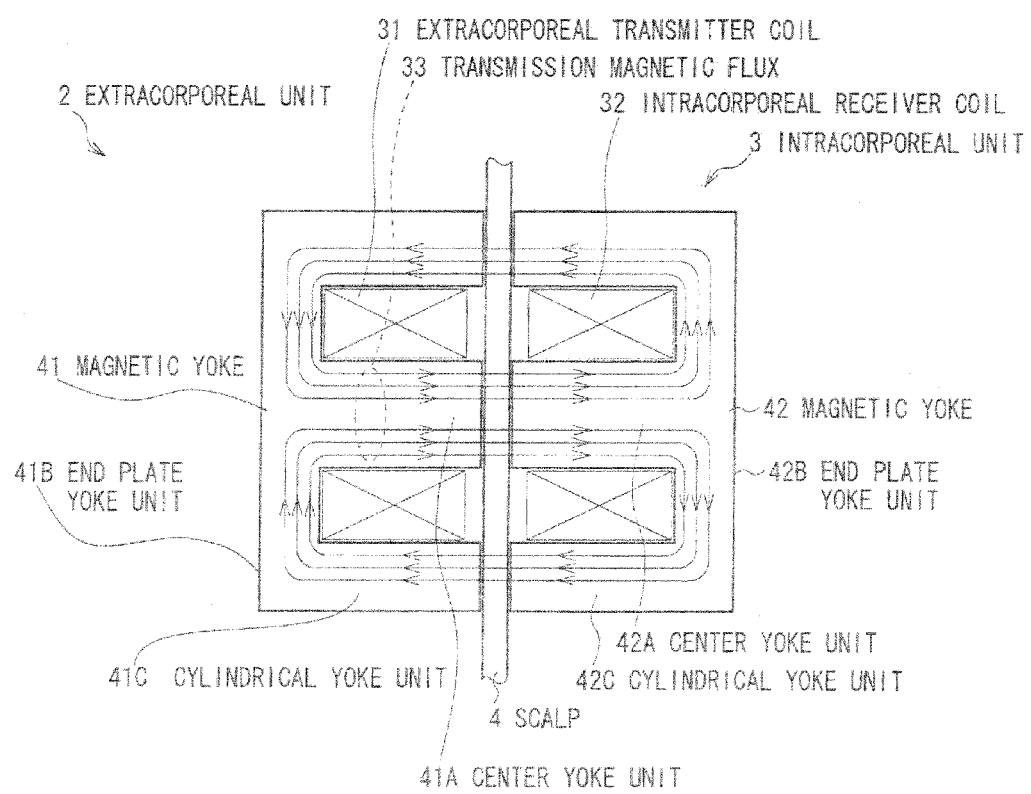
FIG. 6 is a schematic diagram for illustrating magnetic paths formed by a magnetic yoke 41 of an extracorporeal unit 2 and by a magnetic yoke 42 of an intracorporeal unit 3.

Accordingly, as shown in FIG. 6, the transmission magnetic flux 33, which is generated on the cylindrical center yoke unit 41A of the magnetic yoke 41 by the extracorporeal transmitter coil 31 of the extracorporeal unit 2, passes through the scalp 4 as well as the magnetic path from the center yoke unit 42A of the magnetic yoke 42 of the intracorporeal unit 3 through the end plate yoke unit 42B to the cylindrical yoke unit 42C; the transmission magnetic flux 33 further passes through the scalp 4 and then flows through the magnetic path from the cylindrical yoke unit 41C of the magnetic yoke 41 of the extracorporeal unit 2 through the end plate yoke unit 41B to the center yoke unit 41A.

In that manner, the transmission magnetic flux 33 generated on the magnetic yoke 41 of the extracorporeal unit 2 passes through the scalp 4 and is interlinked with the intracorporeal receiver coil 32, thereby generating an induced electromotive force.

Figure 7:
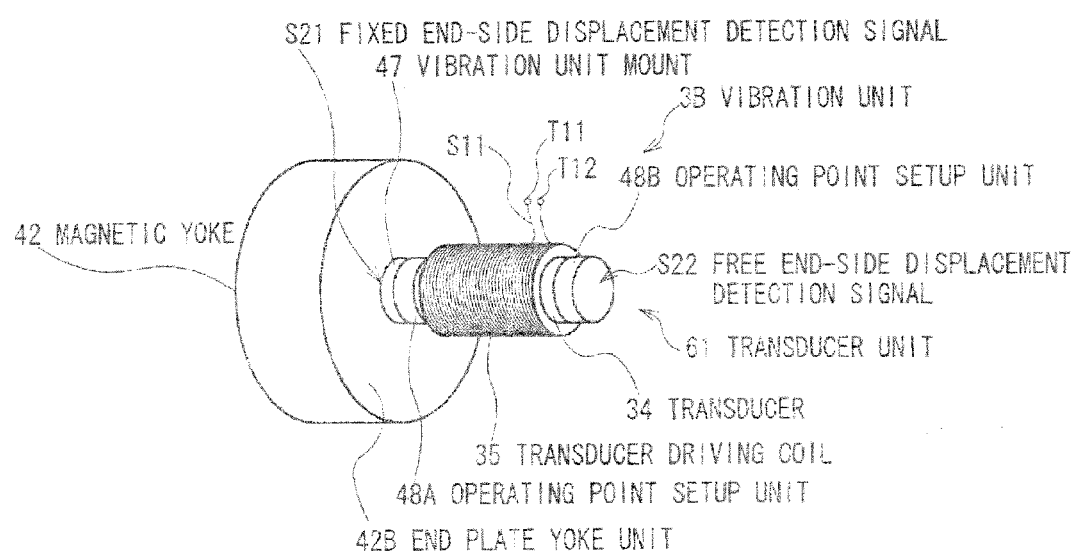
FIG. 7 is a perspective view showing the detailed configuration of a vibration unit 3 of an intracorporeal unit 3.

As shown in FIG. 7, at a center position of an external surface of the end plate yoke unit 42B of the magnetic yoke 42, a disc-shaped vibration unit mount 47 is so formed as to project outward. The vibration unit 3B is bonded to the vibration unit mount 47 so as to project outward.

The vibration unit 3B includes the transducer 34, whose cross-sectional surface is in the shape of a circle and which is made of a rod-shaped giant magnetostrictive element. A pair of operating point setup units 48A and 48B, which are made of a disc-shaped permanent magnet, is bonded to both ends of the transducer 34.

The transducer driving coil 35 is wound around the transducer 34; both end terminals T1 and T2 of the intracorporeal receiver coil 32 are connected directly to both end terminals T11 and T12 of the transducer driving coil 35.

Figure 8:
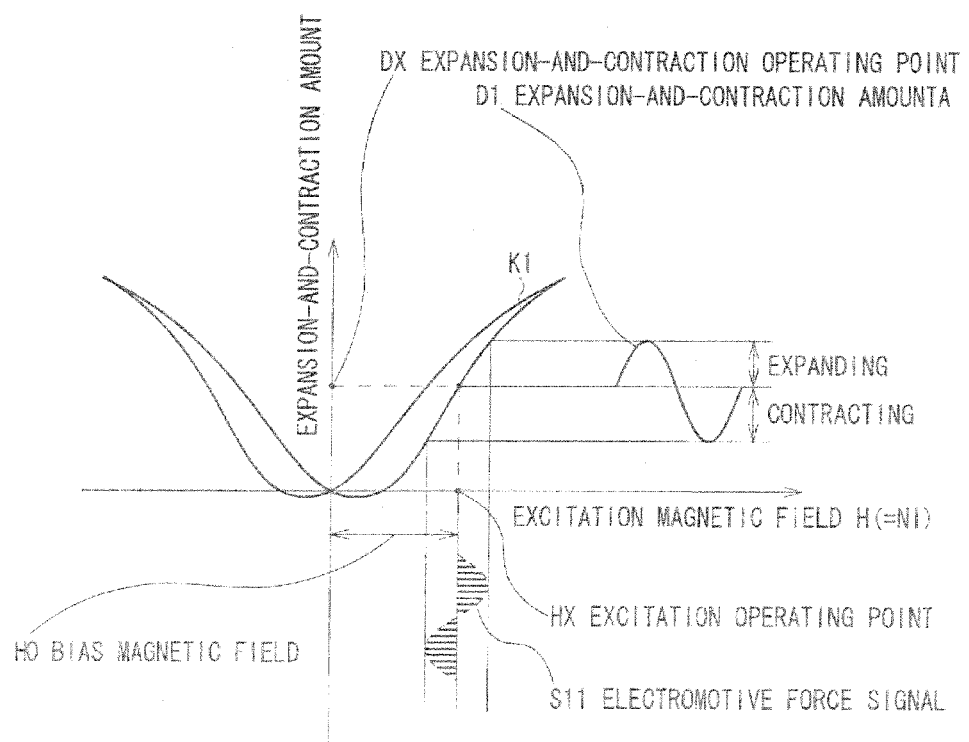
FIG. 8 is a characteristic-curve chart showing elastic properties of a giant magnetostrictive element, of which a transducer 34 is made.

Therefore, an excitation current, which corresponds to the audible sound modulation transmission signal S1 that is obtained after the intracorporeal receiver coil 32 is interlinked with the transmission magnetic flux 33, flows through the transducer driving coil 35. As a result, the transducer 34 expands and contracts because of the elastic properties of the giant magnetostrictive element as illustrated in FIG. 8, thereby making a tip (where a free end is formed as the other end is fixed to the magnetic yoke 42) of the transducer 34 vibrate.

The giant magnetostrictive element, of which the transducer 34 is made, has the following characteristic: As shown in FIG. 8, where changes in the amount of expansion and contraction are represented by an elastic characteristic curve K1, as an excitation magnetic field H expands, the giant magnetostrictive element expands much more in response to the excitation magnetic field H.

According to the present embodiment, a pair of the operating point setup units 48A and 48B, which are made of a permanent magnet, is used at both ends of the transducer 34 made of the giant magnetostrictive element. Accordingly, a bias magnetic field HO is fed to the giant magnetostrictive element. Therefore, when the electromotive force signal S11 is supplied with an excitation operating point HX, which is determined by the bias magnetic field HO, serving as the center, the expansion-and-contraction amount D1 of the transducer 34 changes around an expansion-and-contraction operating point DX, which corresponds to the excitation operating point HX.

As a result, the tip position of the transducer 34 varies according to a change in the expansion-and-contraction amount D1. Therefore, the tip portion of the transducer 34 vibrates.

In the example shown in FIG. 4, the magnetic yoke 42 of the intracorporeal receiver coil 32 is fixed to the skull 5 with fixing screws 45. Moreover, at the tip of the transducer 34, a dome-shaped contact 50 made of a titanium material is provided; an outer surface of the contact 50 is in contact with the skull 5. Therefore, a change at the tip of the transducer 34 is conveyed as vibration to the skull 5 via the contact 50.

As described above, a titanium material is used for the contact 50. Therefore, because of the properties of the titanium material, the contact 50 is well adhered to the skull.

Moreover, it is possible to make effective use of the advantage that the titanium material is excellent in conveying vibration and easy to process.

In the example, the contact 50 is connected to the end plate yoke unit 42B of the magnetic yoke 42 with a connection ring 51, which is made of a flexible material in the shape of a ring. Therefore, the contact 50 is supported in such a way that the contact 50 is able to vibrate.

Figure 9:
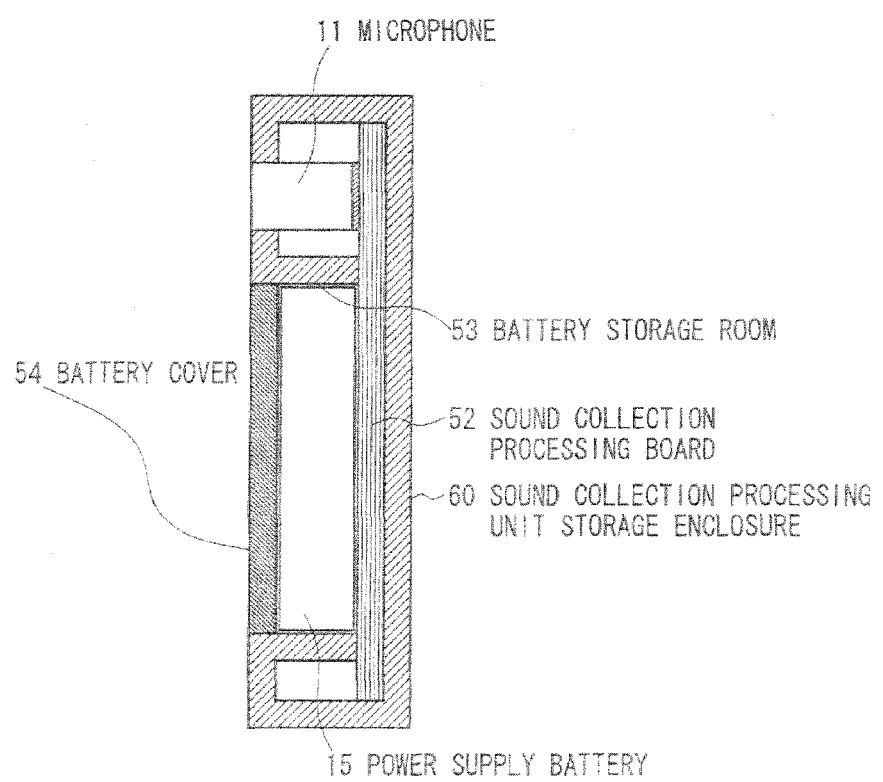
FIG. 9 is a schematic cross-sectional view showing the configuration of a sound collection processing unit 2B of an extracorporeal unit 2.

In the example shown in FIG. 4, the sound collection processing unit 2B includes, as shown in FIG. 9, a sound collection processing board 52, on which the AM modulation circuit 12, the carrier wave oscillating circuit 13 and the output amplifying circuit 14 are mounted as circuitry elements of the sound collection processing unit 2B, inside a sound collection processing unit storage enclosure 60 bonded to the end plate yoke unit 41B of the magnetic yoke 41 that makes up the audible sound modulation signal transmission unit 2A. On the sound collection processing board 52, the microphone 11 and the power supply battery 15, which is stored in a battery storage room 53, are placed.

The power supply battery 15 stored in the battery storage room 53 can be replaced with another directly by a user (without the need for a surgical operation) when necessary since a battery cover 54 can be freely opened and closed.

In the example shown in FIG. 4, in a surgical operation for embedding the intracorporeal unit 3, the intracorporeal unit 3 is embedded in the temporal bone under the skin of the mastoid portion in the vicinity of the auricle of the skull 5; and fixed to the skull 5 with fixing screws 45.

Before the intracorporeal unit 3 is used as the embedded audiophone 1, the user sets the extracorporeal unit 2 at the position that faces the intracorporeal unit 3 on the scalp 4.

Then, the transmission magnetic flux 33 generated by the extracorporeal transmitter coil 31 of the magnetic yoke 41, which makes up the audible sound modulation signal transmission unit 2A of the extracorporeal unit 2, passes through the scalp 4 to form a magnetic path between the magnetic yoke 41 and the magnetic yoke 42 of the intracorporeal unit 3 for transmitting audible sound information.

In addition, in the magnetic path for transmitting the audible sound information, a magnetic flux of the permanent magnet, which is used to set an operating point of the transducer 34, flows in such a way that the magnetic flux is superimposed. The magnetic flux causes an attracting magnetic force that attracts the extracorporeal unit 2 to the intracorporeal unit 3. Therefore, the extracorporeal unit 2 is mounted on the scalp 4 in a stable manner.

Under the above circumstances, the carrier wave oscillating circuit 13 supplies a pulse signal with a frequency of 40 kHz to the AM modulation circuit 12 as a carrier wave signal S3. What is obtained as a result is the audible sound modulation signal S4, a signal that has been amplitude-modulated by the sound collection signal S2 collected by the microphone 11.

The audible sound modulation signal S4, as an energy source to make the transducer 34 of the intracorporeal unit 3 vibrate, is converted to the transmission magnetic flux 33 by the extracorporeal transmitter coil 31; the transmission magnetic flux 33 is interlinked with the intracorporeal receiver coil 32 of the intracorporeal unit 3, thereby generating an induced electromotive force on the intracorporeal receiver coil 32. The induced electromotive force signal S11 is fed to both ends of the transducer driving coil 35 that makes up the vibration unit 3B. As a result, the transducer 34 vibrates.

The transducer 34 is made of a giant magnetostrictive element having the elastic properties as shown in FIG. 8. Therefore, thanks to a self-demodulation function obtained from the vibration characteristics of the giant magnetostrictive element, based on the electromotive force signal S11 that is in an AM demodulation format of the pulse carrier wave, a vibration operation takes place in such a way that the expansion-and-contraction amount D1 changes according to the sound collection signal S2, which is an amplitude-modulated component thereof.

Since the transducer 34 vibrates in response to the sound collection signal 2, which is an amplitude-modulated component for the carrier-wave pulse signal, the audible sound vibrations are supplied to the skull 5 via the contact 50 and conveyed to the auditory ossicles 27 through the skull 5.

As a result, even if the user is for example disabled in such a way that an audible sound signal is not conveyed to the vestibule/cochlea 28 via the external auditory canal 22, the eardrum 23 and the auditory ossicles 27, it is possible for the vestibule/cochlea 28 to receive the audible sound that has reached the external auditory canal 22 thanks to a bone-conduction operation through the skull 5. Therefore, it is possible to send audible sound information to the brain stem.

According to the above configuration, what is realized is the embedded audiphone 1 able to conduct audible sound vibrations through the skull 5 with the use of the extracorporeal unit 2 and the intracorporeal unit 3.

As shown in FIG. 8, the giant magnetostrictive element, which has the elastic properties as shown in FIG. 8, is used as the transducer 34 of the intracorporeal unit 3. Therefore, with the use of the self-demodulation function of the giant magnetostrictive element, it is possible to conduct audible sound vibrations clearly through bone to the vestibule/cochlea 28 with no specific AM demodulation circuit provided.

Figure 10A:
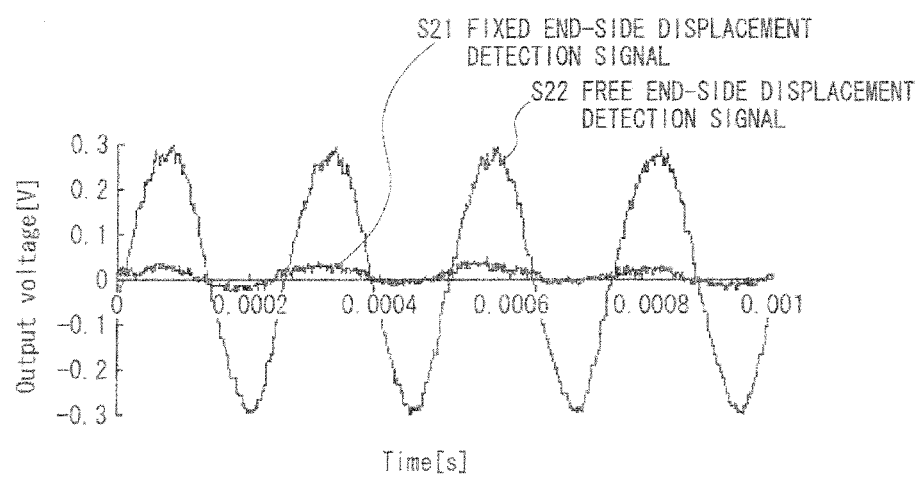
FIG. 10A is a signal waveform chart showing changes of the transducer 34.

In an experiment on an operation of the transducer 34, as shown in FIG. 10A, a displacement measurement device (LDV) detects the following signals: an fixed end-side displacement detection signal S21, which represents a change of a bonded surface between the operating point setup unit 48A of the transducer 34 and the vibration unit mount 47; and a free end-side displacement detection signal S22, which represents a change of an apical surface of the transducer 34. According to the experiment, both signals were detected as being in phase. Therefore, it was confirmed that vibrations occurred in the length direction of the transducer 34 made of a rod-shaped giant magnetostrictive element.

Figure 10B:
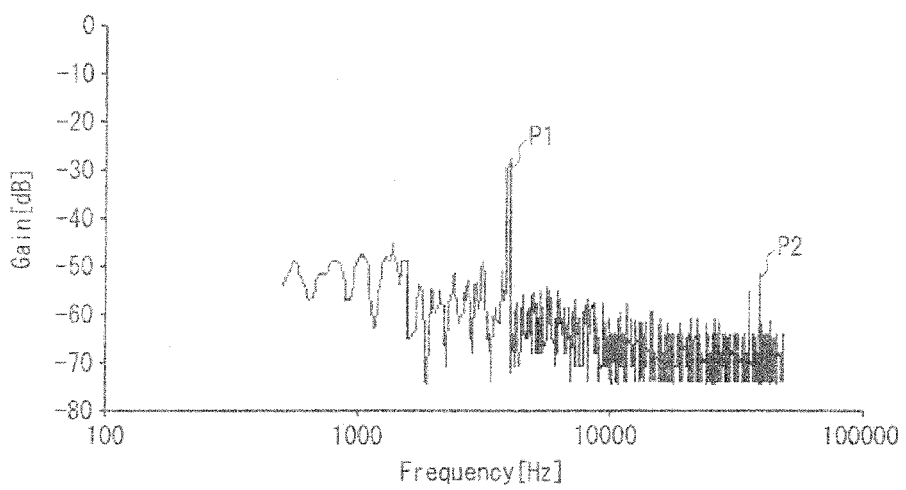
FIG. 10B is a characteristic-curve chart showing a frequency spectrum of a free end-side displacement detection signal S22.

As for a frequency spectrum of the free end-side displacement detection signal S22, as shown in FIG. 10B, it was confirmed that a peak P1 existed in a 4-kHz frequency component and that a peak P2 emerged in a 40-kHz frequency component.

According to the experiment, a 40-kHz pulse signal was used as a carrier signal, whereas a 4-kHz sine wave was used as an audible sound signal. Compared with the peak P2 in the 40-kHz frequency component, the peak P1 in the 4-kHz component, which was an amplitude-modulated signal, was extremely high. Therefore, the result was that as shown in FIG. 8, a transducer unit 61, which was made up of the transducer 34 and a pair of the operating point setup units 48A and 48B provided at both ends of the transducer 34, carried out self-demodulation on the audible sound modulation transmission signal, which was in the format of the signal amplitude-modulated by the pulse carrier wave, and output the expansion-and-contraction amount corresponding to the sound collection signal as the expansion-and-contraction amount D1 of the transducer 34 after the electromotive force signal S11, which was in the format of the signal that was generated after the pulse carrier wave was amplitude-modulated by the audible sound signal, was fed to the transducer driving coil 35 as a vibration driving source.

In that manner, with the extracorporeal unit 2 and the intracorporeal unit 3, it is possible to realize the embedded audiphone 1 able to highly accurately convert the sound collection signal, which is collected by the microphone 11, into a bone conduction signal component.

Therefore, all that is required is to conduct a minor surgical operation to embed the intracorporeal unit 3. There is no need to provide an operational power source in the intracorporeal unit 3. Thus, it is possible to obtain an embedded audiphone that make it unnecessary to conduct a surgical operation or the like to replace the power source inside the body.

(3) Other Embodiments (3-1) According to the above embodiment, the rod-shaped giant magnetostrictive element whose cross-sectional surface is in the shape of a circle is used as the transducer 34. However, similar advantageous effects to those in the above case can be obtained even if the cross-sectional surface is set so as to be in the shape of a square, ellipse or the like when needed.

Moreover, a pair of the operating point setup units 48A and 48B, which are made of a permanent magnet, is provided at both ends of the transducer 34. However, the way the operating point setup units 48A and 48B are inserted may vary. All that is required is to be able to set the bias magnetic field for determining the excitation operating point HX shown in FIG. 8.

(3-2) According to the above embodiment, the intracorporeal unit 3 is so formed that one end of the transducer 34, as a fixed end-side terminal, is fixed to the magnetic yoke 42 on which the intracorporeal receiver coil 32 is wound and that the change of the free end thereof is supplied to the skull 5 as a bone conduction vibration output. However a method of supplying the bone conduction output of the transducer 34 to the skull 5 is not limited to the above. For example, the transducer 34 may be provided as a separate unit from the magnetic yoke 42.

(3-3) According to the above embodiment, as the method of putting the extracorporeal unit 2 on the scalp 4, the attracting magnetic force between the extracorporeal unit 2 and the intracorporeal unit 3 is used. However, in addition to, or aside from, the above, a separate tool for putting the extracorporeal unit 2 on the scalp 4 may be used.

INDUSTRIAL APPLICABILITY

The present invention can be used for an audiphone.

The invention claimed is:

1. An embedded audiphone, characterized by comprising:
an extracorporeal unit that generates a transmission magnetic flux using an extracorporeal transmitter coil on the basis of an audible sound modulation transmission signal that is obtained by amplitude-modulating a carrier wave signal with the use of a sound collection signal obtained from a microphone; and
an intracorporeal unit that is embedded in a skull under scalp, generates an induced electromotive force with the use of the transmission magnetic flux coming from the extracorporeal unit and an interlinked intracorporeal receiver coil, expands and contracts a transducer made of a magnetostrictive element with the use of the induced electromotive force, and therefore supplies vibrations corresponding to the sound collection signal to the skull as bone-conduction vibrations, wherein:
the transducer is a rod-shaped magnetostrictive element, an induced electromotive force obtained from the intracorporeal receiver coil is supplied to a transducer driving coil that is wound on the transducer in order to make an excitation magnetic field pass through the rod shaped magnetostrictive element in a length direction, and the transducer expands and contracts in the length direction as a result;

for the rod-shaped magnetostrictive element, a bias magnetic field is added to the length-direction excitation magnetic field of the rod-shaped magnetostrictive element with the use of an operating point setup unit made of a permanent magnet; and an amplitude demodulation circuit is omitted because of a self-demodulation function of the rod-shaped magnetostrictive element.

\* \* \* \* \*